April 4, 1950      L. P. NOEL      2,502,532
PLOW ATTACHMENT
Filed May 28, 1948      2 Sheets-Sheet 1
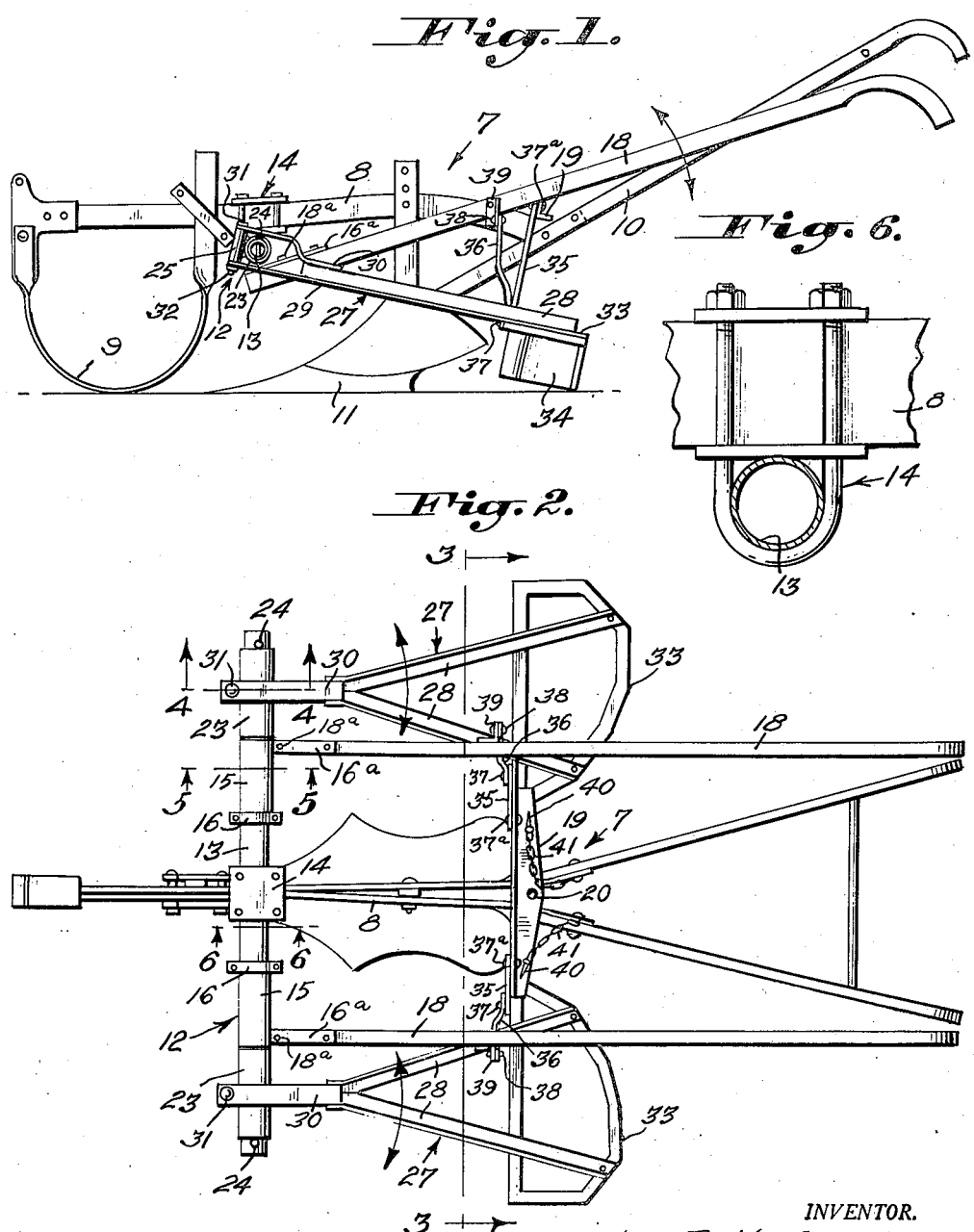
INVENTOR.
Lester P. Noel
BY John N. Rudolph
Attorney.

April 4, 1950 L. P. NOEL 2,502,532
PLOW ATTACHMENT

Filed May 28, 1948 2 Sheets-Sheet 2

Inventor

Lester P. Noel

By John N. Randolph

Attorney

Patented Apr. 4, 1950

2,502,532

UNITED STATES PATENT OFFICE 2,502,532

PLOW ATTACHMENT

Lester P. Noel, Cottonport, La.

Application May 28, 1948, Serial No. 29,672

5 Claims. (Cl. 37—98)

This invention relates to a novel attachment especially adapted for use with a middle buster plow when employed for forming an irrigation ditch through a planted field at an angle to the plant rows thereof and which is manually operable for scraping the dirt thrown laterally from the ditch formed by the plow and by means of which the dirt can be scraped from the furrows between the crop rows and deposited on top of or at the sides of the crop rows to thereby prevent blocking of the furrows adjacent the ditch.

Still another and important object of the invention is to provide an attachment having separately controlled scraper elements located at either side of the plow blade and which are independently operable for releasing and depositing the scraped dirt at the side of or on top of the crop rows when the ditch is being formed at an oblique angle thereto.

Still a further object of the invention is to provide an attachment which is so constructed that in releasing the dirt the dirt will be initially displaced laterally away from the ditch before being deposited against or on the crop row thereby preventing loose dirt from rolling back into the ditch, especially when operating across high rows.

Still a further object of the invention is to provide an attachment of extremely simple construction which may be economically manufactured and sold, which can be readily attached to a middle buster plow and which can be operated by the operator of the plow and will save considerable manual labor normally required for clearing the furrows after cutting of an irrigation ditch.

Various other objects and advantages of the invention will hereinafter become more fully apparent from the following description of the drawings, illustrating a presently preferred embodiment thereof, and wherein:

Figure 1 is a side elevational view showing the attachment applied to a middle buster plow and disposed in an operative position;

Figure 2 is a top plan view thereof;

Figure 3:
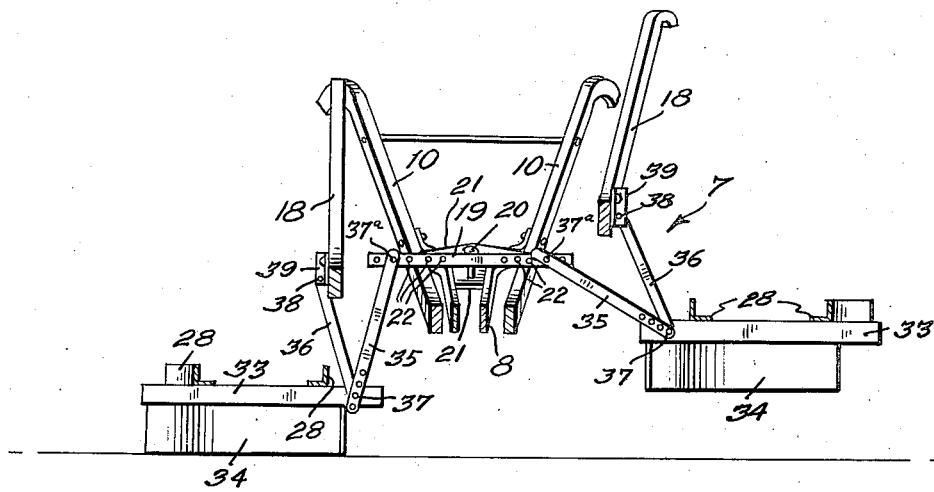

Figure 3 is a cross sectional view taken substantially along a plane as indicated by the line 3—3 of Figure 2, and Figures 4, 5 and 6 are sectional views taken substantially along planes as indicated by the lines 4—4, 5—5 and 6—6, respectively, of Figure 2 and on enlarged scales.

Referring more specifically to the drawings, for the purpose of illustrating the application and use of the attachment, hereinafter to be described, the numeral 7 designates generally a conventional middle buster plow including a plow beam 8, to the forward end of which is adjustably connected a slide runner 9, a pair of handles 10 and a plow blade 11 that is attached to the handle 10 and beam 8 and the cutting depth of which is regulated by adjustment of the slide runner 9.

Figure 5:
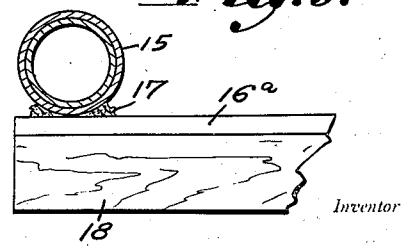

The attachment comprising the invention, designated generally 12, includes a drawbar 13 of circular cross section externally which is detachably secured intermediate of its ends to the plow beam 8 by a clamp, designated generally 14 formed of U-bolts, nuts and plates, as best illustrated in Figure 6 and by means of which the drawbar may be detachably and securely clamped to the plow beam 8 transversely thereof. A pair of inner sleeves 15 are turnably mounted on the drawbar 13, one on either side of the beam 8 and are retained from inward displacement by adjustable collars 16. Each of the sleeves 15, as best seen in Figure 5, has an arm or bar 16a secured as by welding at 17 to a portion of the periphery thereof and which projects transversely of said sleeve and in a direction toward the rear end of the plow 7. A long handle 18 is bolted or otherwise secured as seen at 18a at its forward end to each of the bars 16a and said handles 18 extend rearwardly to adjacent the rear end of the plow handle 10 and are shaped similar thereto except that the attachment handles 18 are not connected to one another.

A bar 19, formed of angle iron as best seen in Figure 3, is secured crosswise of the plow 7 to the beam 8 by means of a bolt 20 which extends through the substantially horizontal side of the bar 19 and through a plate 21 which engages the bottom edges of the sections of the plow beam 8 and which is secured to said bolt 20 by a nut, not shown, for detachably clamping the bar 19 to the upper side of and crosswise of the beam 8. The upstanding, forward side of the bar 19 is provided adjacent each end thereof with a series of longitudinally spaced openings 22.

Figure 4:
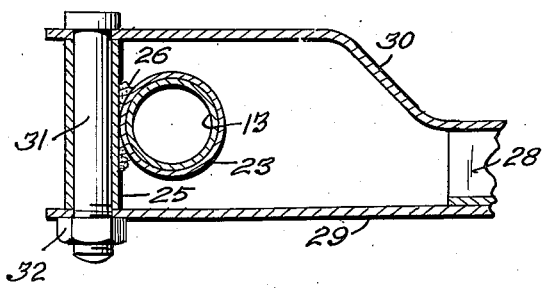

As best illustrated in Figure 2, a pair of sleeve members 23 are journaled on the drawbar 13, one adjacent each end thereof and outwardly of the sleeve members 15 and are detachably held thereon by pins or bolts 24 which extend removably through the drawbar 13 adjacent its ends and outwardly of the sleeves 23. As best seen in Figure 4, a sleeve or tube 25 is secured to each sleeve 23 and transversely thereof by welding or otherwise as seen at 26. A supporting arm 27 comprises a pair of forwardly converging angle irons 28 which are joined at their forward ends and are secured to a pair of metal strap members 29 and 30 which extend forwardly therefrom. The upper strap member 30 is upwardly offset at its forward end and the forward end portions of said strap members 29 and 30 are apertured to receive the shank of a bolt 31 which extends therethrough and through the tube or sleeve 25 and which is held in an applied position by a nut 32 so that the supporting arm 27 can swing horizontally on the bolt 31 as a pivot and may swing vertically on the drawbar 13 as a pivot to thereby provide a universal connection between said drawbar 13 and the supporting arms 27. The rear ends of the angle irons 28 of each supporting arm 27 are bolted or otherwise secured to the upper side of an open frame 33 to the underside of which is secured a scraper blade 34 which depends downwardly therefrom and which extends across the rear portion of its frame 33 from its inner to its outer end. As seen in Figure 2, the rear portions of the frames 33 each merge with the forward portion thereof at the inner end of said frame but the outer end of said rear portion is spaced from the forward portion so that the inner edges of the blades 34 are disposed forwardly of their outer edges, for a purpose which will hereinafter become apparent.

A pair of rigid links 35 and 36 are pivotally connected at their lower ends by a common pivot 37 to the forward side of each scraper frame 33 adjacent its inner end. Each link 35 extends upwardly and inwardly from its scraper frame 33 and is adjustably and pivotally connected at its opposite end by a fastening 37a to one of the openings 22 of the adjacent end of the bar 19. The links 36 extend upwardly from their scraper frame 33 and are pivotally connected at their upper ends by a fastening 38 to an angle bracket 39 which is fastened to the attachment handle 18 and which is disposed substantially above said scraper frame, as best illustrated in Figure 3.

The attachment 12 is sufficiently well balanced on the middle buster plow 7 so that said plow will operate without the operator actually engaging the handle 10 and, accordingly, the operator may utilize his hands for grasping the grip portions of the attachment handles 18. The attachment 12 is utilized where the plow 7 is employed for cutting an irrigation ditch through a field at any angle to the crop rows thereof and the depth of the ditch may of course be regulated by adjustment of the slide runner 9. In the operation of the attachment 12, the handles 18 are disposed in lowered positions as seen in Figure 1, as the scraper blades 34 are moving across a furrow of the field behind and one on either side of the plow blade 11. As the blades 34 approach the crop row on the side of the furrow toward which said blades are moving, the operator swings the handles 18 upwardly. The linkage connection 36 will cause the scraper blades 34 and frames 33 to be elevated with the handles 18 and the links 35 will cause said scraper blades 34 to initially slide outwardly as the handles 18 begin to swing upwardly and to thereafter be swung outwardly and upwardly for depositing the dirt collected thereby against the side of or on top of the crop row. Accordingly, the dirt thrown up from the ditch by the blade 11 is caught on either side of the ditch by the scraper blades 34 and is displaced laterally away from the ditch and deposited on or against the crop row so as to prevent any loose dirt from rolling back into the ditch, particularly where the crop rows are relatively high. It will also be noted that the inner edges of the blades 34 extend forwardly as best illustrated in Figure 1 so that said portions will scrape the dirt laterally away from the ditch as the upward movement of the handles 18 is begun, as previously described. Likewise, the adjustment of the links 35 with respect to the bar 19 permits the inner edges of the blades 34 to be adjustably positioned with respect to the blade 11 so that said edges can be disposed substantially in line with the side edges of the blade 11 to catch all dirt thrown out from the ditch thereby. In cutting diagonally across crop rows it will be readily obvious that one of the scraper members 34 will reach the crop row before the other scraper blade so that the handles 18 will not be operated simultaneously but at a proper time for depositing the dirt from each blade 34 on to or against the crop row. It will thus be apparent that the scraper blades 34 are raised and lowered for engagement with the furrow between each two crop rows and are elevated and thereby lifted over the crop rows for depositing the dirt thereon and are subsequently lowered to engage the furrow on the other side of the crop row onto which the dirt has just been deposited.

A pair of pins 40 are suitably tethered by chains 41 to the plow 7 and are adapted to engage an opening 22 of the bar 19 and under portions of the links 35 for supporting the scraper blades 34 in elevated position when the attachment is not in use.

Various modifications and changes are contemplated and may obviously be resorted to, without departing from the spirit or scope of the invention as hereinafter defined by the appended claims.

I claim as my invention:

1. An attachment for irrigation ditch forming plows comprising a drawbar adapted to be detachably mounted on a plow beam and crosswise thereof, a pair of handles swingably mounted on the drawbar, one on either side of the plow beam, a pair of scraper blades disposed behind and one on either side of the ditch forming blade of the plow, said scraper blades having forwardly projecting supporting arms, and means connecting the forward ends of said supporting arms to the drawbar for universal swinging movement of the scraper blades relatively to the drawbar, each of said scraper blades being disposed adjacent one of said handles and therebeneath, a link connecting each blade to the adjacent handle and pivotally connected to said blade and handle, and link means for adjustably and pivotally connecting each of the blades to the plow whereby when the handles are swung upwardly said blades will swung outwardly and upwardly.

2. An attachment as in claim 1, said blades being disposed with their planes substantially perpendicular and extending substantially transversely of the plow and having forwardly curved inner ends terminating substantially forwardly of the outer ends of the blades, the inner end portions of said blades being adapted to be disposed behind and adjacent the side edges of the plow blade for initially scraping the dirt laterally away from the blade as the handles are swung upwardly.

3. An attachment as in claim 1, said last mentioned means being adjustable for varying the spacing between the blades and for adjustably positioning the inner ends of the blades relatively to the sides of the plow blades.

4. A dirt scraping attachment for irrigation ditch forming plows comprising a crossbar detachably secured to a ditch forming plow and disposed transversely thereof, a pair of scraper blades disposed one on either side of said plow, means for connecting each of the scraper blades individually to said crossbar for horizontal and vertical swinging movement with respect thereto, a pair of handles each connected to said crossbar for vertical swinging movement with respect thereto, one of said handles being disposed substantially above each of the scraper blades, a link pivotally connected to each of said handles and to the scraper blade disposed therebeneath whereby each of said handles may be swung independently of the other for raising and lowering the scraper blade connected thereto, and link means connecting each of said scraper blades to the plow whereby said scraper blades will be swung outwardly and upwardly as the handles are elevated.

5. A dirt scraping attachment for irrigation ditch forming plows comprising a crossbar detachably secured to a ditch forming plow and disposed transversely thereof, a pair of scraper blades disposed one on either side of said plow, means for connecting each of the scraper blades individually to said crossbar for horizontal and vertical swinging movement with respect thereto, a pair of handles each connected to said crossbar for vertical swinging movement with respect thereto, one of said handles being disposed substantially above each of the scraper blades, a link pivotally connected to each of said handles and to the scraper blade disposed therebeneath whereby each of said handles may be swung independently of the other for raising and lowering the scraper blade connected thereto, link means connecting each of said scraper blades to the plow whereby said scraper blades will be swung outwardly and upwardly as the handles are elevated, and means for adjustably connecting said link means to the plow for laterally adjusting said scraper blades with respect to the plow blade.

LESTER P. NOEL.

REFERENCES CITED

The following references are of record in the file of this patent:

UNITED STATES PATENTS

| Number | Name | Date |
|--------|------|------|
| 191,880 | Pirch | June 12, 1877 |